Dec. 13, 1938.  D. KUSKIN  2,140,458
SUCTION MOTOR
Filed Nov. 17, 1934   2 Sheets-Sheet 1
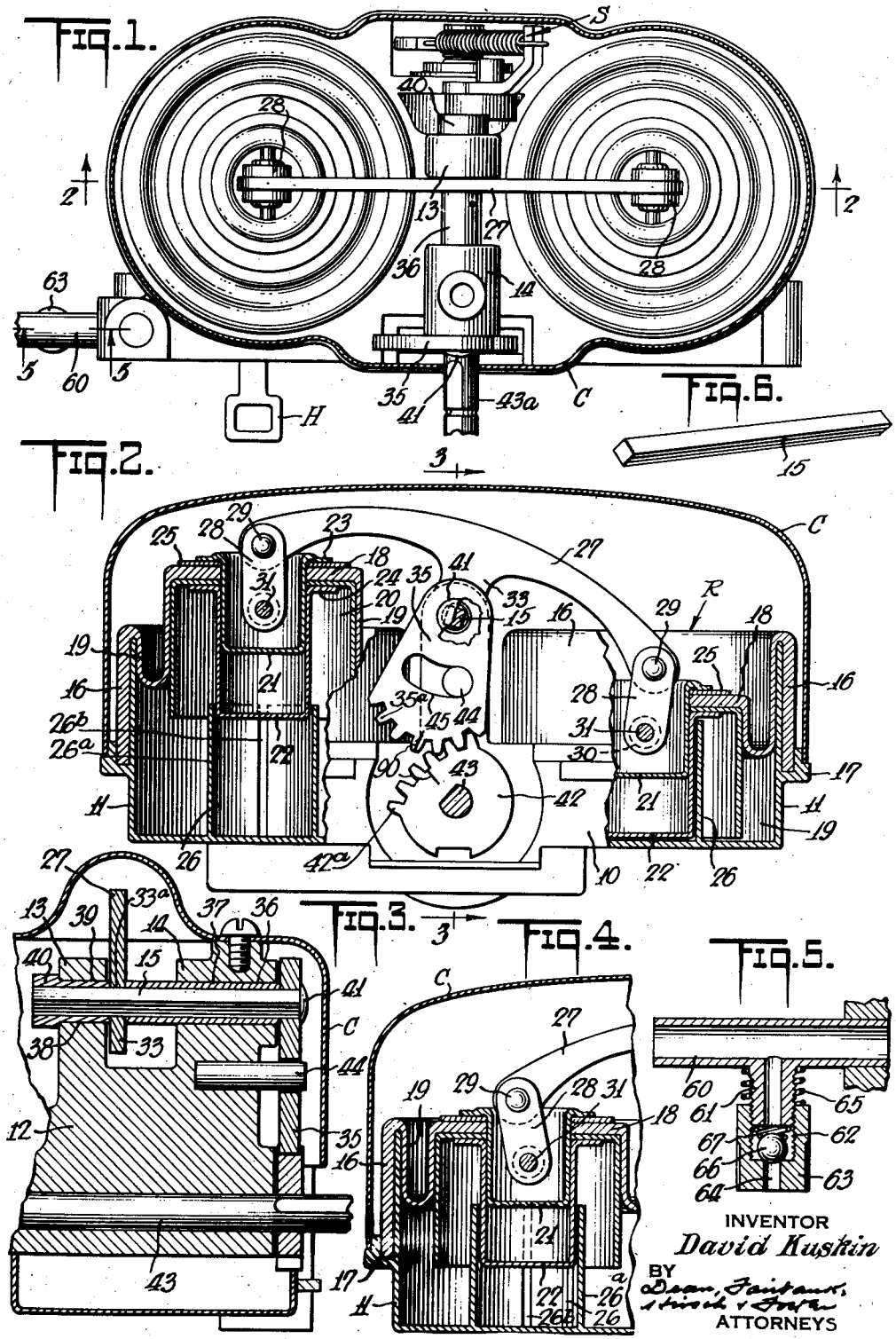

Dec. 13, 1938.                D. KUSKIN                2,140,458
SUCTION MOTOR
Filed Nov. 17, 1934                2 Sheets-Sheet 2
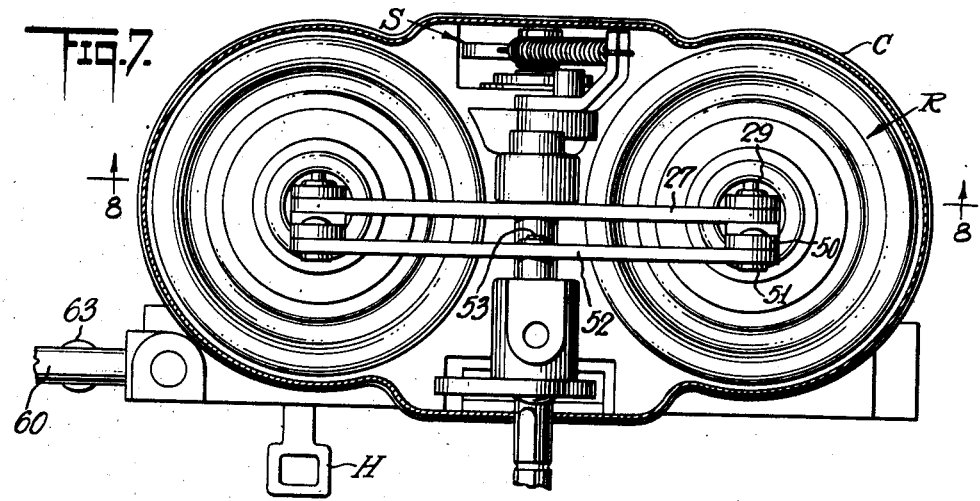
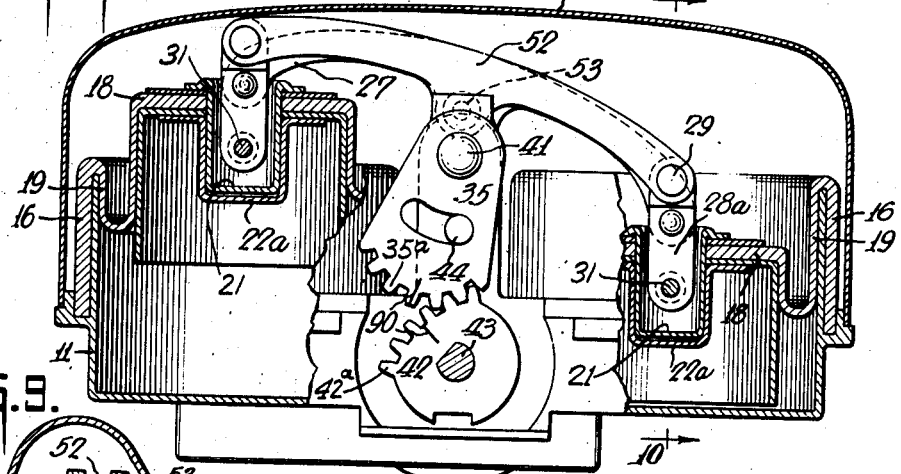
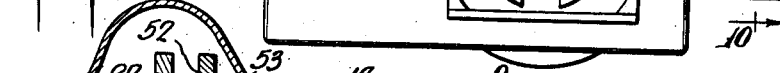
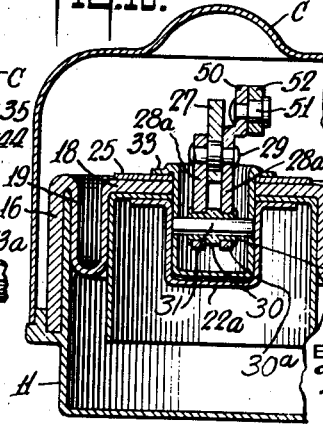 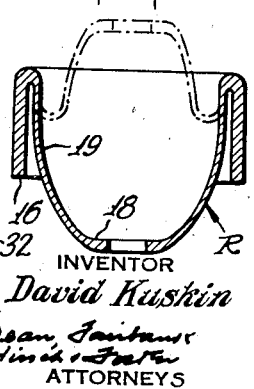
INVENTOR
David Kuskin
BY
ATTORNEYS Patented Dec. 13, 1938

2,140,458

UNITED STATES PATENT OFFICE 2,140,458

SUCTION MOTOR

David Kuskin, New York, N. Y., assignor, by mesne assignments, to Trico Products Corporation, Buffalo, N. Y.

Application November 17, 1934, Serial No. 753,430

6 Claims. (Cl. 121—43)

My present invention is concerned with a fluid pressure operated motor which may have a wide and varied range of usefulness but which finds its preferred embodiment in a light duty suction motor of the type which is suitable for actuating a windshield wiper and which derives its power from the intake manifold of an internal combustion engine or any other suitable source of suction.

The present invention represents an improvement upon the motors disclosed in prior Patents No. 1,912,777 and No. 2,045,861.

The invention has for its object to provide a light duty motor specially adapted for windshield cleaner use which is efficient in operation and practical in design, and further to provide a motor of the type set forth in the above mentioned prior patents wherein the resilient bag or diaphragm members are so constructed and mounted as to insure a longer period of usefulness and thereby render the motor more durable and substantial in its construction.

The invention may be more fully understood from the following description in connection with the accompanying drawings wherein:—

Fig. 1 is a top plan view of the windshield wiper motor embodying the invention, the dust cover therefore being shown in section, Fig. 2 is a view partly in elevation and partly in vertical section, taken approximately on the line 2—2 of Fig. 1, Fig. 3 is a fragmentary transverse sectional detail on the line 3—3 of Fig. 2, Fig. 4 is a fragmentary view generally similar to Fig. 3 and showing one of the working chamber walls in a position intermediate the two extreme positions illustrated in Fig. 2, Fig. 5 is a sectional detail illustrating the auxiliary speed control attachment, Fig. 6 is a perspective view of the squared rock shaft which carries part of the power transmitting, motion translating mechanism, Fig. 7 is a view similar to Fig. 1 but illustrating a modification in which the diaphragm control elements are maintained against tilting by an external parallel linkage mechanism, Fig. 8 is a view corresponding to Fig. 2 but taken on the line 8—8 of Fig. 7, Fig. 9 is a view corresponding to Fig. 3 and taken on the line 9—9 of Fig. 8, Fig. 10 is a view corresponding generally to Fig. 4 but at right angles to the plane of that view and taken on the line 10—10 of Fig. 8, and Fig. 11 is a sectional view through the molded rubber cup before it is assembled on the body.

General assembly

In illustrating the present invention I have shown only so much of the mechanism as is necessary for an understanding of the improvements herein claimed and reference is had to the prior patents, both above identified, for further details of the body casting with its ports and passages, the snap valve mechanism, the cut off valve mechanism and the parking valve mechanism, etc.

Referring first to Figs. 1 to 4 of the drawings, the motor includes a body 10 typically of cast metal, the opposite ends of which afford spaced, parallel, open-ended cylinders 11. Between these cylinders the casting affords a central boss 12 and rising from the boss are a pair of posts 13 and 14 arranged one behind the other, and in which is journalled a rock shaft 15. The cylinders 11 constitute stationary walls of collapsible walled working chambers, the flexible walls of these chambers being defined by rubber bags R having skirt portions 16 telescoped over the mouths of the cylinders to an extent limited by annular cast troughs or stops 17 which encircle the cylinders. It is to be understood that cylinders and telescoped bags are merely illustrative of one of many ways in which the body and distortable diaphragm members might coact to define a distortable walled working chamber. The usual ports through which air may be admitted to or exhausted from their chambers are not shown, reference being had to prior Patent No. 1,912,777 for one suitable port arrangement.

The central portions of bags R are connected by links 26 to the ends of a walking beam 27 having a pendant extension 33 fixed upon rock shaft 15. Journaled in boss 12 directly under rock shaft 15 is a second rock shaft 43 having a projecting end 43a adapted to mount a windshield wiper (not shown). The oscillatory movement of shaft 15 is transmitted to shaft 43 through the intermediacy of intermeshing eccentric segment-gears 35 and 42 fixed respectively on shafts 15 and 43. Reference may be had to my prior Patent No. 2,045,861 for a clear understanding of the manner in which a snap-valve mechanism S controlled by shaft 43 places the two working chambers alternately in communication with the atmosphere and (through conduit 60) with a source of subatmospheric pressure. I have also omitted any showing here of the master control valve for cutting the motor out of communication with suction line 60 although the handle for this valve appears at H.

The working chambers

As illustrated, the skirt portions 16 of the bags and the central portions 18 of the bags are advantageously of greater thickness than the foldable sections 19 of the bag which connect them. Means may be provided, if desired, to reinforce the bag centers and to regulate and control the flexure of the bags. Such means are here illustrated as inverted, generally cup-shaped, light metal shells 20, the external diameter of which is appreciably less than the internal diameter of the cylinders 11. The thickened centers 18 of the bags lie against the tops of the inverted cups 20 and are clamped to these cups by a pair of telescoping thimbles 21 and 22. The thimbles are provided with outwardly flaring flanges 23, 24 at their mouths. The bag top 18 and the center of the cup 20 are provided with registering openings corresponding to the external diameter of the upper thimble 21. As these thimbles are forced into telescoping engagement, the flanges 23 and 24 firmly clamp the bag top 18 to the cup 20. This clamping action insures an airtight connection. By making the bag centers of relatively thick rubber, tight clamping and perfect sealing may be accomplished without splitting or unduly gouging or otherwise injuring the rubber at the clamping region. To the end that pressure may be applied over a substantial area in the center of the bag, a stiff washer member 25 may be interposed between the bag top and the flange 23 so that substantially the entire central area of the bag is firmly squeezed and clamped between the top of the cup and the washer.

The lower thimble 22 serves an additional function as a guide element, this thimble being of somewhat less external diameter than the internal diameter of a longitudinally slit guide tube or socket 26 therefor, said socket being defined by an upstanding flange 26a rising from and preferably integral with the bottom of the cylinder 11.

The relatively thin wall portion 19 of the bag is predisposed to flex in an inwardly extending annular bight or fold in all positions of the bag. Part of this annular fold lies against the skirt of the cup 20 and part of it lies against the inner face of the cylinder 11.

Due to the method of molding the bag (which will be more fully hereinafter explained) the normal tendency of the bag portion 19 is to assume an inwardly flexed position and to tend to urge the center of the bag inwardly. The bag is in fact molded as illustrated in Fig. 10 and after the cup 20 has been attached to the center of the bag, the bag center is pushed through the skirt, being turned almost inside out as indicated in dotted lines. Thus when the skirt is slipped over the cylinder, the normal tendency of the bag center is to move downwardly through the skirt, such movement being restrained of course by the attachment of the bag center to the walking beam. This inherent tendency of the bag center to move inwardly is important however in that the annular bight or fold formed in the bag portion 19 always lies between the cylinder and guide cup. On the working stroke of the chamber no unnatural or forced flexure or stretching of the rubber occurs.

As air is exhausted from the left hand working chamber of Fig. 2, the movable wall of this chamber will start to move inwardly, the thimble 22 and socket 26 coacting to prevent any substantial tilting of the control cup 20, and the slots 26b or other openings in the socket preventing a dashpot effect. As the cup 20 moves inwardly to approximately the intermediate position (shown in Fig. 4), it will be seen that part of the annular bight afforded by the bag portion 19 has in effect been peeled from the outside of the control cup or guide cup 20 and part of the bight has been drawn (by suction) against the inner wall of the cylinder. When the flexible wall of the chamber has completed its inward stroke, the parts will be in the position illustrated at the right hand end of Fig. 2 in which position most of the bight lies against the inner wall of the cylinder and but a small portion thereof remains on the guide cup. The existence of sub-atmospheric pressure within the working chamber prevents the bight from becoming doubly or triply folded and jammed between the outer wall of the guide cup and the inner wall of the cylinder, it being borne in mind that that portion of the bight which constitutes the lowest portion thereof is always being drawn downwardly and furthermore that sub-atmospheric pressure tends to draw the rubber against the inner wall of the cylinder. This very tendency which causes a braking or jamming action with the bag of my prior patent above identified, here operates advantageously in the present case to prevent jamming or braking of the diaphragm itself since in the present case there is never any tendency to drag the rubber along the inside surface of the cylinder wall.

The connection between the upper or inner clamping thimble and the walking beam 27 which is pivoted on the rock shaft 15 may correspond to the connection illustrated in my prior application above identified. Pairs of links 28 pivoted as at 29 to the ends of the walking beam extend into the thimbles and are pivoted upon a bushing 30 carried by cross pin 31, the ends of which are fixed in the thimble 21. The bushing 30 is reduced at its ends as at 30a (Fig. 10) to prevent movement of the link ends toward each other and is also turned over as at 32 to prevent relative separation of the lower ends of the pairs of links.

Rock shaft assemblage

The walking beam 27 at its intermediate portion is provided with a pendant extension 33 having a non-circular opening 33a therein to receive the non-circular rock shaft 15. One end of this rock shaft projects through a correspondingly shaped opening 34 in the segmental gear 35. A bushing 36, force fitted onto the rock shaft 15 oscillates in a suitable transverse bore 37 in the post 14. Cooperating with this bushing to definitely position the rocker arm extension 33 is a second bushing 38 oscillatable in a bore 39 in the post 13, which bore is axially aligned with bore 37. The bushing 38 is provided with a head 40 working against one face of the post 13 to limit axial movement of the rocker arm assembly in one direction. The adjacent ends of the two bushings are forced against opposite sides of the rocker arm extension 33. The gear 35 is slipped over the squared projecting end of the rock shaft 15 and is forced against the outer end of the longer bushing 36 by upsetting or riveting over the end of the rock shaft as at 41.

The sequence of assembly operations is as follows:—

First the gear 35 is riveted onto the end of the shaft 15, then the bushing 36 is forced over the shaft 15 until it abuts the gear 35; then the shaft and bushing 36 are inserted through the front of the post 14 and the squared end of the shaft 15 passes through the registering opening 33a of the walking beam extension and thereafter the shorter bushing 38 is forced home to lock the entire assemblage consisting of the walking beam, the rock shaft, the two bushings and the gear 35 against independent movement.

Inasmuch as the ends of the walking beam are already connected by links to the two guide cups the automatically correct keying of the walking beam extension and the gear on the rock shaft as an incident of assembly insures rocking of the gear through exactly the correct arc as the working chambers are alternately ensmalled and enlarged to effect oscillation of the walking beam. It will be borne in mind that the gear 35 meshes with a gear 42 on the wiper carrying shaft 43 which is mounted in the casting 10 and that the shaft 43 controls the motion of the snap valve mechanism indicated generally at S (Fig. 1). Thus since the rocker arm assembly insures the movement of the gear 35 through exactly the right range, timing of the valve is automatically taken care of assuming that the gears are correctly intermeshed with respect to each other. This can readily be assured by placing registering marks 90 on the tooth of one gear and adjacent the tooth receiving interdental space of the other gear. This is in direct contradistinction to the rocker arm assemblage of prior Patent No. 1,912,777 where great care had to be exercised in order to lock the segment gear 35 and walking beam at exactly the correct relative angle on a round shaft.

The eccentric gears

As a means for positively limiting movement of the walking beam structure, a stud 44 projects from the face of the boss 12 and coacts with an arcuate slot 45 in the toothed segment or gear 35. It will be observed that the arc of the toothed portion 42a of the gear 42 is not an arc drawn about the axis of the shaft 43 but that the center teeth of this set 42a are closer to the axis of the shaft 43 than the end teeth. A complementary eccentric tooth arrangement is provided on the lower toothed end 35a of the segment member 35 except that here the center teeth of the set 35a are further removed from the axis of the rock shaft 15 than are the end teeth of the set 35a. It will thus be apparent that when the centers of the toothed sections of the gears are in mesh, that is to say, when the collapsible walled chambers are approximately midway of their respective strokes, the leverage of gear 35 and gear 42 will be at its minimum and this leverage will increase toward the ends of the stroke.

It will also be apparent that upon the initiation of the stroke, the highest leverage will prevail. This gearing arrangement as above suggested insures the application of greatest power to the blade at the start of the stroke and at the end of the stroke. It quickly tends to overcome any tendency to lag due to blade inertia at the start of the stroke and it is effective to supply the additional power necessary to advance an increasingly heavy load of snow before the wiper blade at the end of the stroke and prevent stalling of the blade at a point just before the snap valve action is tripped.

The parallel linkage control

In Figs. 7 to 10 I have illustrated a slightly modified construction in which the socket member 26 is eliminated and means is disposed externally of the working chambers to effectively prevent any tilting of the control members as they move in and out of the cylinders. In this case the thimble 22a corresponding to the thimble 22 may be considerably shortened since it no longer has any guiding function.

In accordance with this form of the invention the links which connect the walking beam and the innermost of the clamping thimbles, have no pivotal connection with the thimbles but project rigidly upward and outwardly beyond the thimbles into which they snugly fit. This may be accomplished by making the links 28a corresponding to links 28, of slightly greater width and/or thickness, or by making the thimbles of slightly less internal diameter so that the tight fit of the links within the thimble prevents pivotal movement between the links and thimbles.

Also one link of each pair is longer than its fellow and above its point of pivotal connection with the walking beam it is provided with an offset upward extension or ear 50 pivoted as at 51 to the end of a secondary lever 52, the latter being fulcrumed intermediate its ends as indicated at 53 upon the rear face of the post 14.

The pivot of the lever 52 is in the same vertical plane as the pivot, i. e. rock shaft connection of the walking beam 27 and the vertical distance between pivot 53 and the axis of the rock shaft 15 corresponds exactly with the vertical distances between the pivotal connections at 51 and 29 between the links 28a and the levers 52 and 27 respectively. Thus a true parallel lever system is provided comprising levers 27, 52 and the links which connect the ends of these levers and the guide cups 20 are restrained by this lever system against tilting or canting. Any internal guide means such as the socket 26 is rendered unnecessary.

In this connection it may be noted that the socket might be omitted even with the construction of Fig. 1 and the thimble 22 correspondingly shortened, since with a properly molded diaphragm or cup it is merely necessary to reinforce the center of the cup in order to insure steady uniform folding movement or flexure of the cup or bag as air is alternately exhausted from and admitted to the chamber. Also if the skirt portions 16 of the cups were sufficiently stiff or suitably reinforced the body or casting need constitute only the base or bottom of the working chamber. Any other suitable means (such for instance as that shown in prior Patent No. 1,912,777) for coupling a resilient diaphragm to a body so that they cooperatively form a collapsible walled chamber might be resorted to.

The purpose of the guide mechanism, whether internal or external, is to guard against any tilting or canting of the bag centers which might occur during abnormal operating conditions or due to tampering with the motor when the motor dust cover C is removed. The center of the diaphragm or bag will normally inherently tend to move directly inwardly without canting regardless of any guide mechanism and the guide mechanism herein illustrated is primarily intended to inhibit tilting and canting and consequent jerky motion of the wiper blade under abnormal conditions.

In Fig. 5 I have illustrated an extremely simple attachment for regulating the speed of the motor. In this view 68 represents a rigid pipe or tube forming part of the suction line which connects the motor to the intake manifold or other source of suction. This pipe is provided intermediate its ends with a laterally extending nipple 61, the latter being externally threaded for connection with an internally threaded socket 62 formed in a nut 63 to be screwed over the nipple. Nut 63 has a central air bleeding passageway 64 therein aligned with the passage of the nipple 61.

A coiled expansion spring 65 encircling the nipple 61, reacting against the pipe 60 and bearing against the nut 63 tends to hold this nut in any desired position of adjustment. Coacting with the inner end of the port 64 is a valve 66 here illustrated as a ball valve but which may be of any desired character, the valve being held against its seat by a spiral spring 67 reacting against the end of the nipple 61.

It will be observed that by manually adjusting the nut 61, the tension on the valve 66 may be regulated and this valve tension determines the maximum speed of operation of the wiper. It will also be observed that by screwing the nut 63 fully home, the valve 66 may be forced against the outer end of the passage in the nipple 61 to positively block any entrance of air into the pipe 60.

In normal operation however, the valve 66 is unseated by differential internal and external pressures whenever abnormally low pressures prevail in the manifold and the suction line 60. The air which bleeds around this valve automatically increases the air pressure in the line 60 or in other words reduces vacuum and thereby checks the speed of the motor.

The valve 66 will remain open or at least will chatter on its seat as long as abnormally high vacuum conditions prevail and as soon as normal operating conditions are restored, it will be reseated by its spring 67. It is worthy of note that this simple air bleeding mechanism serves as an effective governor of the maximum motor speed and yet is devoid of any parts which project into or obstruct the free flow of air through the pipe 60. It will also be apparent that Fig. 5 shows merely a crude and elementary form of auxiliary speed control mechanism operating solely on the air bleeding principle.

Having thus described my invention, what I claim as new and desire to secure by Letters Patent is:—

1. In a suction motor a working chamber including a cylindrical socket and a power applying member comprising a molded rubber diaphragm closing the mouth of the socket, reinforcing means fixed with respect to the center of the diaphragm, said diaphragm including an annular inwardly extending bight or fold portion disposed between said reinforcing means and the socket wall, said diaphragm being molded normally so as to tend to urge the reinforced central portion inwardly toward the bottom of the socket.

2. In a suction motor a working chamber including a cylindrical socket and a power applying member comprising a resilient diaphragm closing the mouth of the socket, reinforcing means fixed with respect to the center of the diaphragm, said diaphragm including an annular inwardly extending bight or fold portion disposed between said reinforcing means and the socket wall, said reinforcing member including an inwardly extending, approximately cylindrical member connected to the center of the diaphragm and sufficiently smaller in diameter than the socket to prevent pinching of the bight of the diaphragm between the reinforcing member and the socket, the diaphragm tending by its own inherent resiliency to move inwardly toward the bottom of the socket and means predetermining the range of movement of the diaphragm so that a portion of the bight always lies against the inside wall of the socket and a portion of the bight always lies against the outer cylindrical surface of the reinforcing member.

3. In a suction motor, a working chamber, said chamber including a rigid cylindrical portion and a rubber cup telescoped over the mouth of said cylindrical portion and constituting the power applying movable chamber wall, reinforcing means at the center of the cup substantially preventing flexure of the cup center, the material of the cup affording an inwardly extending annular bight portion between the reinforcing means and the cylinder mouth, the skirt portion of the cup which telescopes over the cylindrical portion and the central reinforced portion of the cup being of substantially greater thickness than the bight portion.

4. In a suction motor, a working chamber, said chamber including a rigid cylindrical portion and a rubber cup telescoped over the mouth of said cylindrical portion and constituting the power applying movable chamber wall, reinforcing means at the center of the cup substantially preventing flexure of the cup center, the material of the cup affording an inwardly extending annular bight portion between the reinforcing means and the cylinder mouth, the skirt portion of the cup which telescopes over the cylindrical portion and the central reinforced portion of the cup being of substantially greater thickness than the bight portion, the reinforced cup center due to the inherent resiliency of the cup normally tending to move inwardly toward the bottom of the socket.

5. A motor of the class described including a body member presenting a pair of spaced parallel sockets, rubber diaphragms closing the mouths of the sockets, a walking beam fulcrumed between the sockets, means connecting the ends of the walking beam to the diaphragms, means reinforcing the centers of the diaphragms and said diaphragms including annular inwardly extending bight portions lying in all positions of movement of the diaphragms between said reinforcing members and the walls of the sockets, said reinforcing members being generally cylindrical and of substantially smaller diameter than the sockets and means to substantially prevent canting of the reinforced central diaphragm portion as air is alternately exhausted from and admitted to the chambers, said last named means being arranged exteriorly of the working chambers.

6. A motor of the class described including a body member presenting a pair of spaced parallel working chambers, rubber diaphragms constituting the movable walls of said chambers, a walking beam fulcrumed between the chambers, means reinforcing the centers of the diaphragms and means rigid with said reinforcing means connecting the ends of the walking beam to the diaphragms, means coacting with the walking beam to substantially prevent canting of the reinforced central diaphragm portions as air is alternately exhausted from and admitted to the chambers, said last named means including a secondary lever, parallel to the walking beam, pivoted at its ends to said rigid connecting means and coacting with the walking beam to afford a parallel lever motion.

DAVID KUSKIN.